United States Patent
Suzuki (10) Patent No.: US 7,174,878 B2
(45) Date of Patent: Feb. 13, 2007

(54) ENGINE INTAKE CONTROL DEVICE (75) Inventor: Mikihiko Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/994,304

(22) Filed: Nov. 23, 2004

(65) Prior Publication Data
US 2005/0279325 A1 Dec. 22, 2005

(30) Foreign Application Priority Data
Jun. 16, 2004 (JP) ............................. 2004-178559

(51) Int. Cl.
*F02D 1/00* (2006.01)
*F02D 31/00* (2006.01)
(52) U.S. Cl. ...................... 123/399; 123/366
(58) Field of Classification Search ............... 123/399, 123/366
See application file for complete search history.

(56) References Cited
U.S. PATENT DOCUMENTS
5,483,939 A * 1/1996 Kamura et al. ............. 123/492
5,698,780 A * 12/1997 Mizutani et al. ........... 73/118.2
5,765,372 A * 6/1998 Mitobe et al. ................ 60/301

FOREIGN PATENT DOCUMENTS
JP 9-508954 A 9/1997

OTHER PUBLICATIONS
2002-4 Mazda Atenza "maintenance manual", 4 pages.
2003-9 Mazda Axela "introduction of new model cars", 6 pages.

* cited by examiner

*Primary Examiner*—John T. Kwon
(74) *Attorney, Agent, or Firm*—Sughrue Mion, PLLC

(57) ABSTRACT

Provide is an engine intake control device in which components such as attachment brackets, attachment screws for attaching respective solenoid valves around an engine are not required, and the number of attachment operations is reduced. The engine intake control device includes: a throttle chamber (1); a throttle valve (5) rotatably provided in the throttle chamber (1) using a valve shaft (2); an electric motor (6) provided outside an air passage (50); a coupling mechanism (51) for transmitting a driving force of the electric motor (6) to the valve shaft (2); a cover (7) provided on one side of the throttle chamber (1) to cover the coupling mechanism (51); and a solenoid valve (10) attached to the throttle chamber (1) for applying a negative pressure in a surge tank to an external negative pressure actuator and interrupting application of the negative pressure to the external negative pressure actuator. The solenoid valve (10) is provided integrally with the cover (7).

12 Claims, 7 Drawing Sheets

ENGINE INTAKE CONTROL DEVICE

BACKGROUND OF THE INVENTION

1. Field of the Invention

The present invention relates to an engine intake control device for adjusting air intake volume of an engine by driving an electric motor to open and close a throttle valve.

2. Description of the Related Art

An engine intake control device in which an electric motor is used to open and close a throttle valve for adjusting air intake volume of an engine has been put into practice.

Further, in recent years, a variable intake device that switches intake passages by utilizing intake pulsation and intake inertia to increase air intake volume over a wide range of engine revolutions for improving engine performance, and an air flow control valve device which controls an air flow introduced into a cylinder of an engine in accordance with operating conditions, and generates a swirl flow or a tumble flow to improve mixing condition of the fuel and air and combustion condition for improving engine performance and the exhaust gas have been adopted in many occasions.

As a driving source of these devices, a diaphragm type negative pressure actuator is often used. One or more solenoid valves are attached around the engine for switching between application of the negative pressure in the surge tank to the negative pressure actuator and interruption of applying the negative pressure. Hose piping for connection to the negative pressure passage, and wiring for electrical connection are provided for each of the solenoid valves (for example, see 2002–4 MAZDA ATENZA "maintenance manual" and 2003–9 MAZDA AXELA "introduction of new model cars").

In the engine intake control device, brackets or screws are required for attachment of the respective solenoid valves. Assembling operations for providing the hose piping for connection to the negative pressure passage, and wiring for electrical connection are laborious. The cost of components, and the production cost are high.

Since considerable space is required for installing the solenoid valves, hose piping, and electrical wiring, it is difficult to downsize the engine intake control device. Further, the weight of these components is heavy.

SUMMARY OF THE INVENTION

The present invention has been made to solve the problems, and an object of the present invention is to provide an engine intake control device in which components such as attachment brackets and attachment screws for attaching respective solenoid valves around an engine are not required, the number of attachment operations is reduced to achieve low cost, the space required for attachment is reduced, the number of components is reduced to achieve lightweight, and improvement in engine performance can be achieved.

According to the present invention, there is provided an engine intake control device: a throttle chamber forming an air passage of an engine intake system; a throttle valve rotatably provided in the throttle chamber using a valve shaft; an electric motor provided outside the air passage; a coupling mechanism for transmitting a driving force of the electric motor to the valve shaft; a cover provided on one side of the throttle chamber to cover the coupling mechanism for protecting the coupling mechanism; and an electromagnetic valve attached to the throttle chamber for applying a negative pressure in a surge tank to an external negative pressure actuator and interrupting application of the negative pressure to the external negative pressure actuator, the surge tank being provided for suppressing intake pulsation, in which the electromagnetic valve is provided integrally with the cover.

DESCRIPTION OF THE PREFERRED EMBODIMENTS

Hereinafter, embodiments of the present invention will be described. Wherever possible, the same reference numbers are used in the drawings and the description to refer to the same or like parts.

First Embodiment

Figure 1:
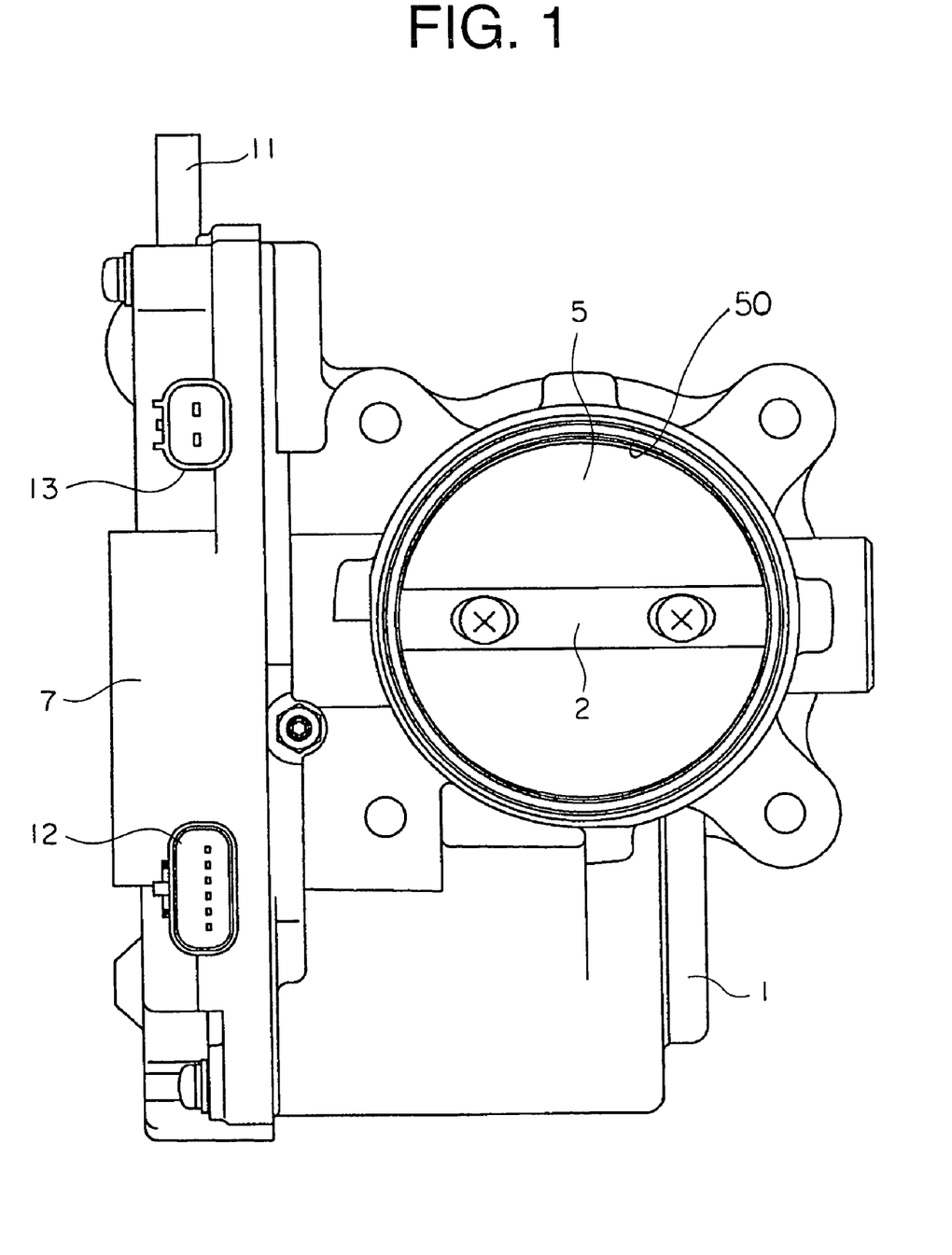
FIG. 1 is a front view of an engine intake control device according to a first embodiment of the present invention.
Figure 2:
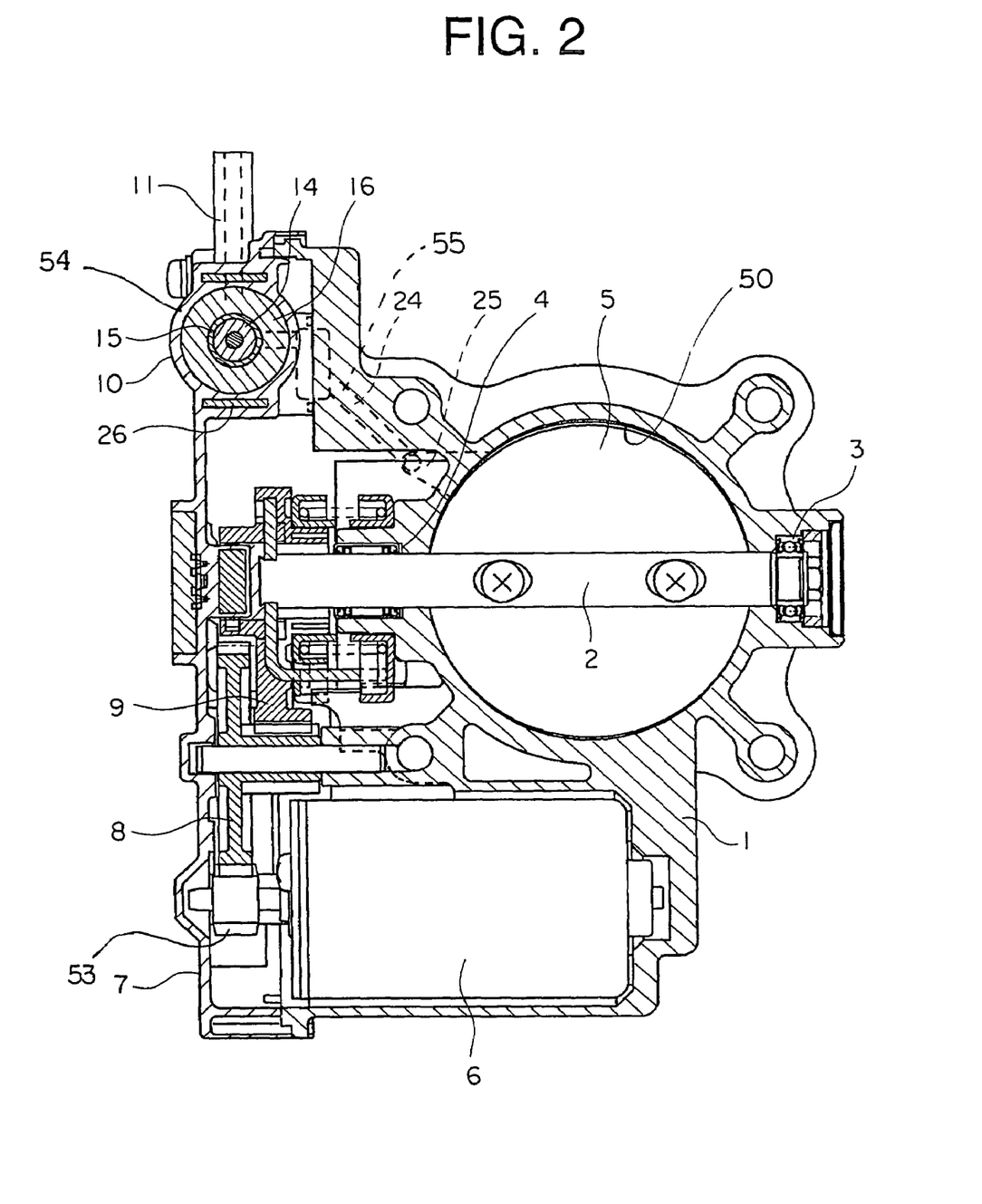
FIG. 2 is a cross sectional front view of the engine intake control device in FIG. 1.
Figure 3:
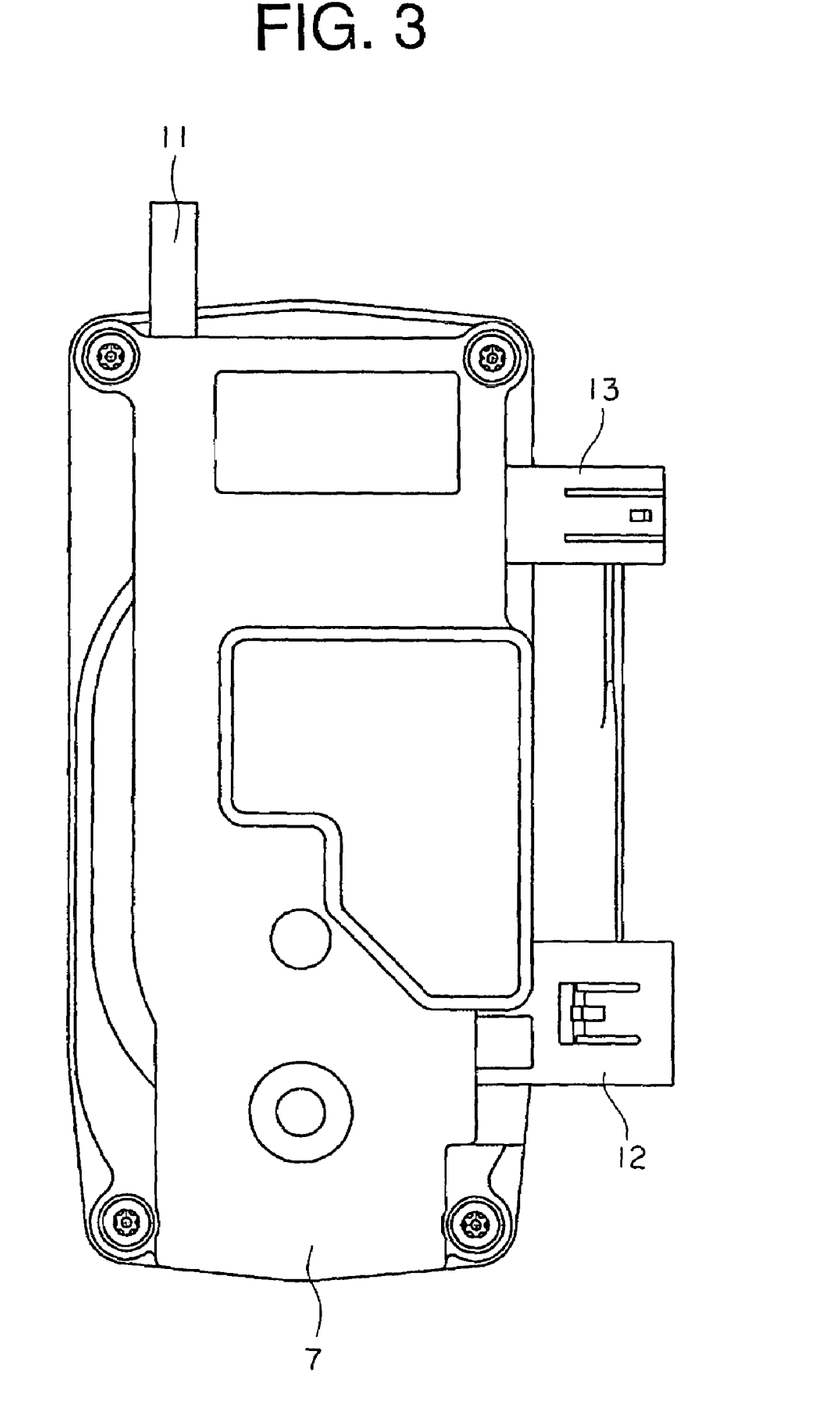
FIG. 3 is a left side view of the engine intake control device in FIG. 1.
Figure 4:
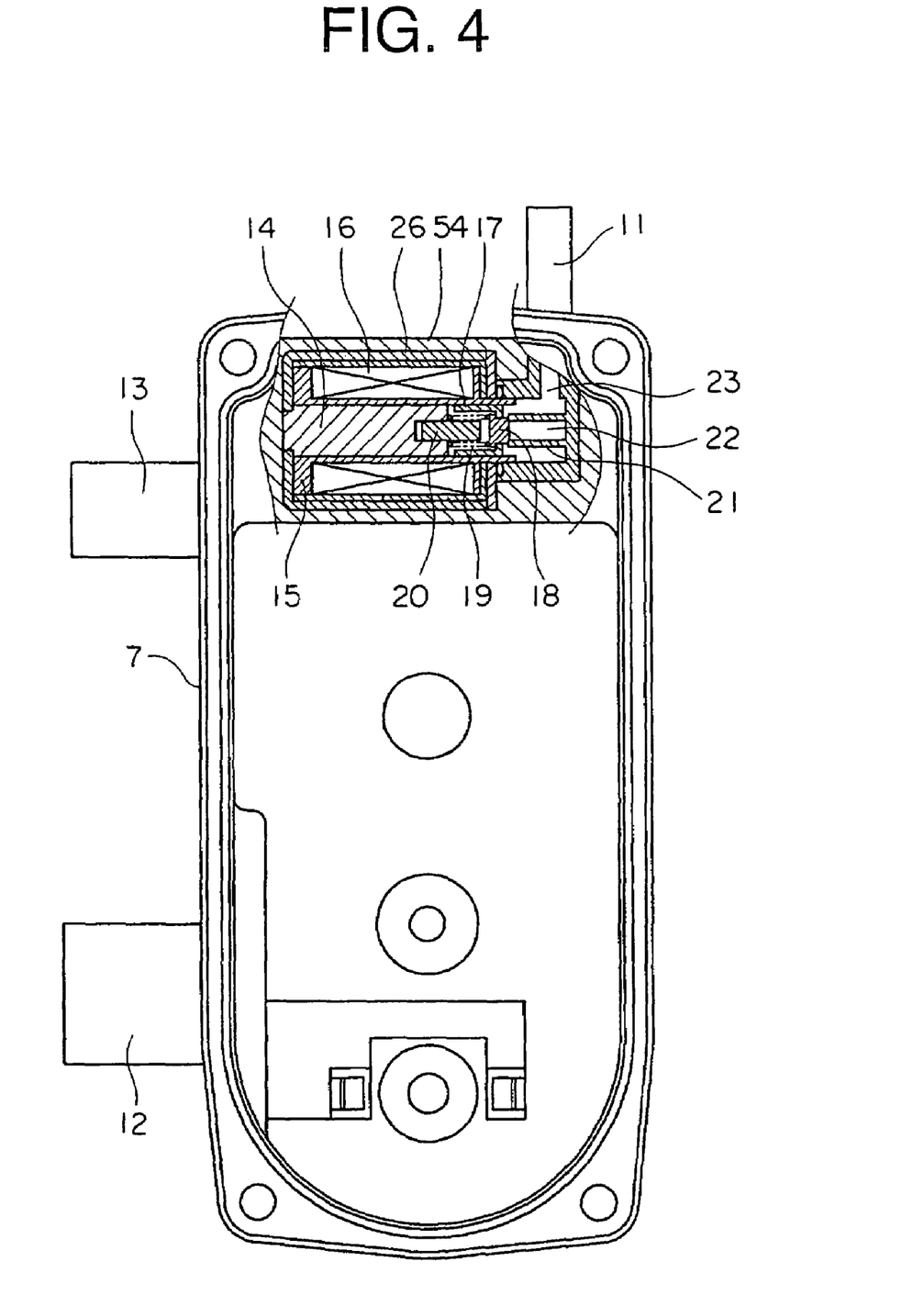
FIG. 4 is a partial cross sectional right side view of a cover in FIG. 1.
Figure 5:
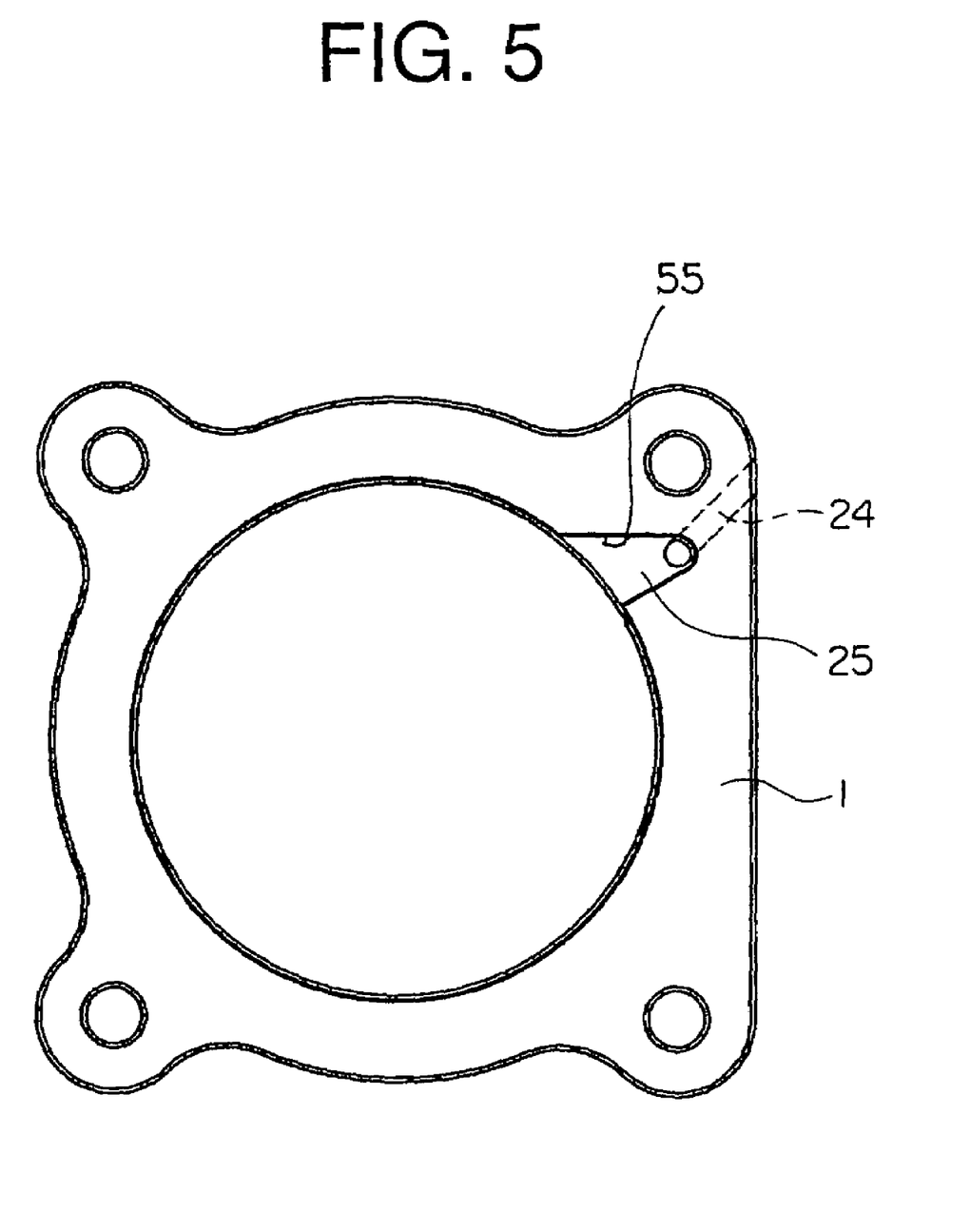
FIG. 5 is a rear view of a throttle chamber in FIG. 1, showing an attachment surface to which a surge tank is attached.

FIG. 1 is a front view of an engine intake control device according to a first embodiment of the present invention. FIG. 2 is a cross sectional front view of the engine intake control device in FIG. 1. FIG. 3 is a left side view of the engine intake control device in FIG. 1. FIG. 4 is a partial cross sectional right side view of a cover in FIG. 1. FIG. 5 is a rear view of a throttle chamber in FIG. 1, showing an attachment surface to which a surge tank is attached.

The engine intake control device includes a throttle chamber 1, a throttle valve 5, and an electric motor 6. The throttle chamber 1 forms an air passage 50 in an engine intake system. The throttle valve 5 is provided in the throttle chamber 1 using a valve shaft 2, and is rotatably supported by a first bearing 3 and a second bearing 4. The electric motor 6 is provided outside the air passage 50.

Further, the engine intake control device includes a coupling mechanism 51, a cover 7, and a solenoid valve 10. The coupling mechanism 51 transmits a driving force of the electric motor 6 to the valve shaft 2 in accordance with an operation signal from an engine control unit. The cover 7 is provided on one side of the throttle chamber 1 to cover the coupling mechanism 51. The cover 7 protects the coupling mechanism 51 by preventing entry of foreign material or water into the coupling mechanism 51. The solenoid valve 10 is an electromagnetic valve attached to the throttle chamber 1 for allowing the negative pressure in a surge tank which prevents intake pulsation (the surge tank is provided behind the engine intake control device in FIG. 1, and thus, not shown) to be applied to an external diaphragm type negative pressure actuator (not shown) or interrupting application of the negative pressure to the diaphragm type negative pressure actuator.

The cover 7 is made of synthetic resin. An electrical connector 13 of the solenoid valve 10 is provided integrally with the cover 7. Further, an electrical connector 12 of the electric motor 6 and a rotational angle sensor for detecting throttle opening degree is provided integrally with the cover 7.

In the coupling mechanism 51, a gear 53 of the electric motor 6 is in mesh with a first gear 8. A second gear 9 is in mesh with a small diameter portion of the first gear 8.

The solenoid valve 10 has an outer casing 54 made of synthetic resin. The outer casing 54 is provided integrally with the synthetic resin cover 7. As shown in FIG. 4, a lead wire is wound around a bobbin 15 outside a core 14 to form a coil 16. A yoke 26 is provided outside the coil 16. A cylindrical plunger 17 having a bottom is provided at one side of the core 14. A valve 18 is attached to the bottom of the plunger 17 such that the valve 18 faces a valve seat 21. A spring 19 is provided between the core 14 and the valve 18, and the spring 19 is guided by a guide rod 20. The spring 19 constantly applies its elastic force to the valve 18 toward the valve seat 21 such that valve 18 is in contact with the valve seat 21. At the valve 18, when the coil 16 is energized to generated an electromagnetic force, the plunger 17 moves toward the core 14 in opposition to the elastic force of the spring 19. Thus, the valve 18 is spaced from the valve seat 21.

A surge tank side passage 22 is formed in the valve seat 21. The surge tank side passage 22 is connected to a nipple side passage 23 when the valve 18 is spaced from the valve seat 21. The nipple side passage 23 is connected to a nipple 11 as a tube joint provided integrally with the cover 7. The nipple 11 is connected to a diaphragm type negative pressure actuator for a variable intake device that switches intake passages (not shown) through a hose (not shown).

If there are a plurality of intake passages between an air inlet and the throttle chamber 1, one of the intake passages is selected by a valve driven by the diaphragm type negative pressure actuator.

Likewise, if there are a plurality of intake passages between the surge tank and an intake port of the engine, one of the intake passages is selected by the valve driven by the diaphragm type negative pressure actuator.

As shown in FIG. 5, the surge tank side passage 22 is connected to the surge tank through a communication passage 55. The communication passage 55 includes a groove 25 and a passage 24. The groove 25 is formed along an inner circumferential wall surface of the throttle chamber 1. One end of the passage 24 is exposed to the groove 25 and the other end the passage 24 is connected the surge tank side passage 22.

In the engine intake control device, when the electrical current from the electrical connector 13 flows through the coil 16 of the solenoid valve 10, the valve 18 is spaced from the valve seat 21 in opposition to the elastic force of the spring 19. As a result, the negative pressure in the surge tank is applied to the diaphragm type negative pressure actuator for the variable intake device through the groove 25, the passage 24, the surge tank side passage 22, the nipple side passage 23, and the hose for switching the intake passages.

When the supply of the electrical current to the coil 16 is interrupted, the valve 18 is brought into abutment with the valve seat 21 by the elastic force of the spring 19. Thus, application of the negative pressure in the surge tank to the diaphragm type negative pressure actuator is interrupted.

In the engine intake control device according to the present embodiment of the present invention, the solenoid valve 10 for switching the intake passages is provided integrally with the cover 7. Thus, it is not necessary to use components such as attachment brackets or attachment screws which would otherwise be required for attaching the solenoid valve around the engine. The number of assembling operations is reduced to achieve low cost. Further, the space required for attachment is reduced. The number of attachment components is reduced to achieve lightweight, and improvement in engine performance can be achieved.

The communication passage 55 connecting the solenoid valve 10 and the surge tank is provided in the throttle chamber 1. Thus, piping hoses for connecting the solenoid valve 10 and the surge tank, nipples for connecting the hoses, and the number of operations for assembling these components are reduced to achieve low cost. The engine intake control device can be installed in a small space, and has a lightweight.

The nipple 11 connected to the negative pressure actuator through the hose is provided integrally with the synthetic resin cover 7. Therefore, in comparison with the case in which the nipple is provided as a separate component, and attached under pressure or using screws in subsequent production steps, the number of production steps, and the number of components required for production are reduced to achieve low cost.

Since the outer casing 54 of the solenoid valve 10 is provided integrally with the synthetic resin cover 7, a body of the solenoid valve 10 can be attached simply to the cover 7. Thus, the engine intake control device can be produced at a low cost, and installed in a small space. The engine intake control device has a lightweight. Further, attachment of the solenoid valve 10 can be carried out reliably, and the reliability of the product is improved.

The electrical connector 13 of the solenoid valve 10 is provided integrally with the synthetic resin cover 7. Therefore, in comparison with the case in which lead wires drawn from the solenoid valve are attached to a connector, components such as water proof seals, or lead wires can be reduced, and assembling operation of the engine intake control device can be carried out simply at a low cost. Since the number of electrical connections is reduced, the reliability of the engine intake control device is improved.

The electrical connector of the electric motor 6 and the rotational angle sensor for detecting throttle opening degree is provided integrally with the synthetic resin cover 7. In comparison with the case in which electrical connectors of the solenoid valve, the electric motor, and the angle sensor are provided separately, the number of assembling operations can be reduced.

Second Embodiment

Figure 6:
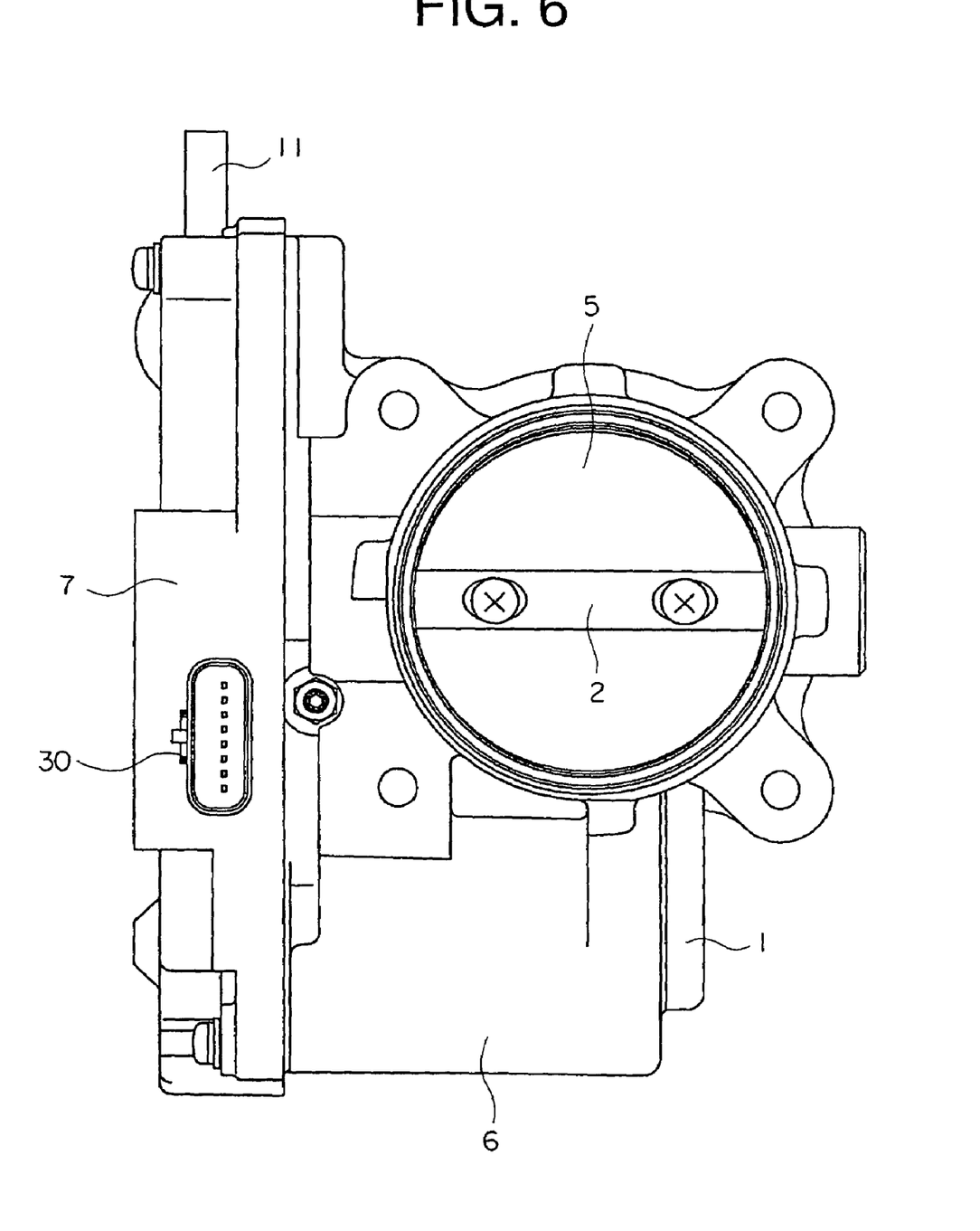
FIG. 6 is a front view showing an engine intake control device according to a second embodiment of the present invention.

FIG. 6 is a front view showing an engine intake control device according to a second embodiment of the present invention.

In the first embodiment, the electrical connector 13 of the solenoid valve 10, and the electrical connector 12 of the electric motor 6 and the rotational angle sensor for detecting throttle opening degree are separately provided. In contrast, in the second embodiment, these connectors 12 and 13 are integrated into a single connector 30, and the connector 30 is provided integrally with the cover 7.

Other structural features of the second embodiment are the same as those of the first embodiment.

In the engine intake control device, the number of assembling operations is reduced in comparison with the case in which the connectors 12 and 13 are provided separately on the cover 7.

Alternatively, the electrical connector of the solenoid valve 10 and the electrical connector of only one of the electric motor and the rotational angle sensor for detecting throttle opening degree may be integrated into a single connector.

Third Embodiment

Figure 7:
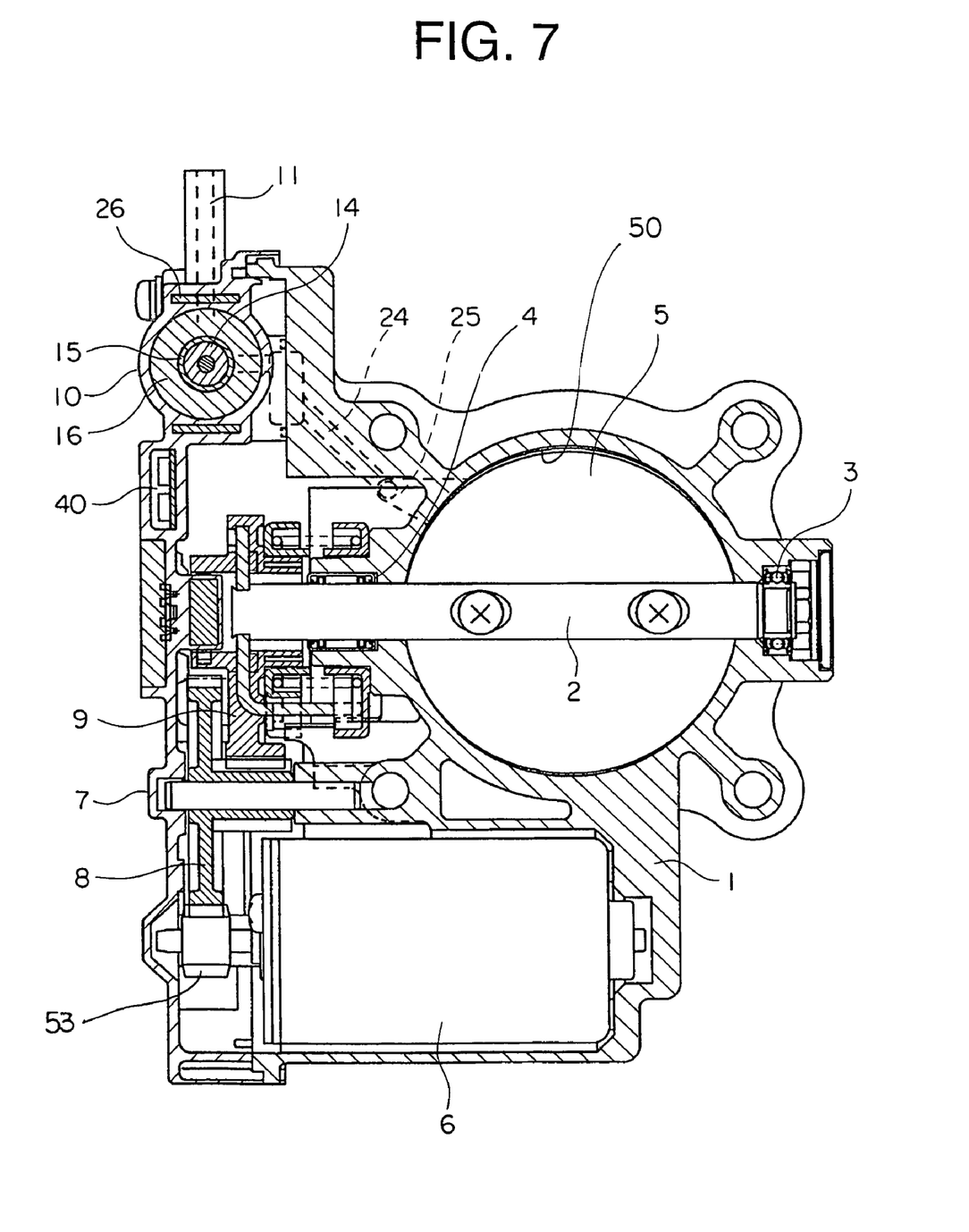
FIG. 7 is a cross sectional front view showing an engine intake control device according to a third embodiment of the present invention.

FIG. 7 is a cross sectional front view showing an engine intake control device according to a third embodiment of the present invention. In the third embodiment, a drive circuit 40 for driving the solenoid valve 10 is attached to the cover 7.

Other structural features of the third embodiment are the same as those of the first embodiment.

In the engine intake control device, it is possible to reduce the raise of temperature in the engine control unit, the reliability is good, and the size is small in comparison with the case in which the engine control unit has a drive circuit for driving the solenoid valve.

In the embodiments as described above, the actuator of the variable intake device is used as the diaphragm type negative pressure actuator. The variable intake device applies the negative pressure in the surge tank to the diaphragm type negative pressure actuator and interrupts application of the negative pressure to the diaphragm type negative pressure actuator by operation of the solenoid valve 10. Switching of the intake passage is thus performed. However, it should be appreciated that the actuator used as the diaphragm type negative pressure actuator may not be the actuator of the variable intake device.

For example, an actuator as a device for driving an air flow control valve which controls an air flow introduced into a cylinder of an engine and generates a swirl flow or a tumble flow may be used as the diaphragm type negative pressure actuator. In this case, the same advantages as with the first embodiment can be obtained.

Alternatively, an actuator for driving a waste gate valve which switches exhaust passages of an engine having a turbo charger may be used as the diaphragm type negative pressure actuator. In this case also, the same advantages as with the first embodiment can be obtained.

Further, a solenoid valve for an actuator of a variable intake device, a solenoid valve for an actuator as a device for driving an air flow valve, and a solenoid valve for an actuator for driving a waste gate vale may be provided integrally with a same cover at intervals.

In the embodiments described above, the solenoid valve 10 is used as the electromagnetic valve. However, it is appreciated that it is not essential to use the solenoid valve 10 as the electromagnetic valve for carrying out the present invention.

In the embodiments described above, the diaphragm type negative pressure actuator is used. However, it should be appreciated that the negative pressure actuator is not limited to the diaphragm type.

What is claimed is:

1. An engine intake control device comprising:
   a throttle chamber forming an air passage of an engine intake system;
   a throttle valve rotatably provided in the throttle chamber using a valve shaft;
   an electric motor provided outside the air passage;
   a coupling mechanism for transmitting a driving force of the electric motor to the valve shaft;
   a cover provided on one side of the throttle chamber to cover the coupling mechanism for protecting the coupling mechanism; and
   an electromagnetic valve attached to the throttle chamber for applying a negative pressure in a surge tank to an external negative pressure actuator and interrupting application of the negative pressure to the external negative pressure actuator, the surge tank being provided for suppressing intake pulsation,
   wherein the electric motor is operated to open and close the throttle valve for adjusting air intake volume of an engine; and
   the electromagnetic valve is provided integrally with the cover which is made of synthetic resin.

2. The engine intake control device according to claim 1, wherein the negative pressure actuator is an actuator for a variable intake device that switches between an intake passage between an air inlet and the throttle chamber and an intake passage between the surge tank and an air intake port of the engine.

3. The engine intake control device according to claim 1, wherein the negative pressure actuator is an actuator for a device that drives an air flow control valve for controlling an air flow introduced into a cylinder of the engine, and generating a swirl flow or a tumble flow.

4. The engine intake control device according to claim 1, wherein the engine has a turbo charger, and the negative pressure actuator is an actuator for driving a waste gate valve which switches exhaust passages of the engine.

5. The engine intake control device according to claim 1, wherein a communication passage connecting the electromagnetic valve and the surge tank is formed in the throttle chamber.

6. The engine intake control device according to claim 1, wherein a tube joint connected to the negative pressure actuator via a hose is provided integrally with the cover.

7. The engine intake control device according to claim 1, wherein an outer casing of the electromagnetic valve is provided integrally with the cover.

8. The engine intake control device according to claim 1, wherein an electrical connector of the electromagnetic valve is provided integrally with the cover.

9. The engine intake control device according to claim 1, wherein an electrical connector of at least one of the electric motor and a rotational angle sensor for detecting throttle opening degree is provided integrally with an electrical connector of the electromagnetic valve.

10. The engine intake control device according to claim 1, wherein the cover includes a drive circuit for driving the electromagnetic valve.

11. The engine intake control device according to claim 1, wherein the electromagnetic valve comprises a solenoid valve.

12. The engine intake control device according to claim 1, wherein the negative pressure actuator comprises a diaphragm type negative pressure actuator.

* * * * *